(12) United States Patent
D'Alessio

(10) Patent No.: US 11,320,621 B2
(45) Date of Patent: May 3, 2022

(54) TRANSVERSE DRIVE KINEMATIC OPTIC MOUNT

(71) Applicant: Thorlabs, Inc., Newton, NJ (US)

(72) Inventor: Brett D'Alessio, Califon, NJ (US)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 17/160,106

(22) Filed: Jan. 27, 2021

(65) Prior Publication Data

US 2021/0294061 A1 Sep. 23, 2021

Related U.S. Application Data

(60) Provisional application No. 62/967,654, filed on Jan. 30, 2020.

(51) Int. Cl.
*G02B 7/00* (2021.01)

(52) U.S. Cl.
CPC .................. *G02B 7/005* (2013.01)

(58) Field of Classification Search
CPC ....... G02B 7/005; G02B 7/1827; G02B 7/003
See application file for complete search history.

(56) References Cited

U.S. PATENT DOCUMENTS

2020/0028311 A1* 1/2020 Hudek ................... G02B 27/10

* cited by examiner

*Primary Examiner* — Joseph P Martinez
(74) *Attorney, Agent, or Firm* — Myers Wolin, LLC

(57) ABSTRACT

An optical mount including a first frame and a second frame; wherein the first frame includes a drive adjuster configured to move along a first direction and the drive adjuster is in contact with a ramp on a pusher piston, such that a movement of the drive adjuster causes the pusher piston to move along a second direction; wherein the pusher piston is configured to push kinematic contacts on the second frame resulting in a controlled movement of the second frame by the drive adjuster.

32 Claims, 23 Drawing Sheets

NOMINAL POSITION

SECTION A-A

TRANSVERSE DRIVE KINEMATIC OPTIC MOUNT

CROSS REFERENCE TO RELATED APPLICATIONS

This application claims the benefit of U.S. Provisional Patent Application No. 62/967,654 filed on Jan. 30, 2020. The disclosure of U.S. Provisional Patent Application 62/967,654 is hereby incorporated by reference.

FIELD OF THE INVENTION

The present invention relates to kinematic optic mounts, and more specifically to a transverse drive kinematic optic mount.

BACKGROUND

A typical longitudinal drive kinematic mount converts the rotational radial motion of an adjuster drive screw oriented longitudinally to the desired linear motion into an axial lineal motion that is longitudinal to the adjuster screw. A typical ultra-stable POLARIS Longitudinal drive kinematic mount produced by THORLABS is shown in FIG. 1.

All the current vertical drive mounts on the market with wedge angles that were used to tip the face plates were fixed in an upward facing orientation as shown in FIG. 2. This was necessary because the wedge pusher was fixed in a vertical orientation. This orientation is not optimized to minimize crosstalk between pitch and yaw adjustments. This orientation is not optimized to minimize beam steering due to thermal expansion. This orientation is not optimized to minimize kinematic movement about the thermal kinematic center of initial. The adjuster push rod is also not constrained in a tight bore, making it free to wobble and move around. This all results in poor adjustment performance and poor beam pointing stability over time and environmental influences.

As shown in FIG. 2, the vertical fixed wedge push rod was shorter at the top kinematic location and longer at the bottom kinematic location. This causes a significant delta in beam steering due to different amounts thermal expansion between the short and long push rods. The two push rods are also free to bounce around as then are not well constrained.

There are flexure type vertical drives on the market as shown in FIG. 3, but due to their compact packaging the flexures are compact and they all highly stress the materials. These highly stressed flexures all perform differently due to the large variance in shape from one piece to another, resulting in noticeable different amounts of crosstalk between products. The flexures also have a very high spring constant resulting in too little spring force at one end of the range and too much spring force at the other end of the range. The high stress in the materials also releases over time temperature and vibration, resulting in very poor beam pointing stability over time temperature and vibration.

Therefore, users have been longing for a transverse drive kinematic optic mount that can fulfill the following:
a. The need to make adjustment further away from the beam path to prevent obstruction of the beam or image.
b. The need to make adjustments without having access to the rear of the mount.
c. The need to add a wedge ratio to the adjustment. This will allow the user to either gain resolution at the cost of travel or gain adjustment range at the cost of resolution.
d. The need to orient the adjuster screw at any angle 360 degrees about the pusher axes of rotation.
e. The need to have the adjuster screw tilted from, for example, 5 to 175 degrees about the pusher.

SUMMARY

An embodiment provides an optical mount including a first frame and a second frame; wherein the first frame includes a drive adjuster configured to move along a first direction and the drive adjuster is in contact with a ramp on a pusher piston, such that a movement of the drive adjuster causes the pusher piston to move along a second direction; wherein the pusher piston is configured to push kinematic contacts on the second frame resulting in a controlled movement of the second frame by the drive adjuster.

DETAILED DESCRIPTION OF THE PREFERRED EMBODIMENTS

Figure 1:
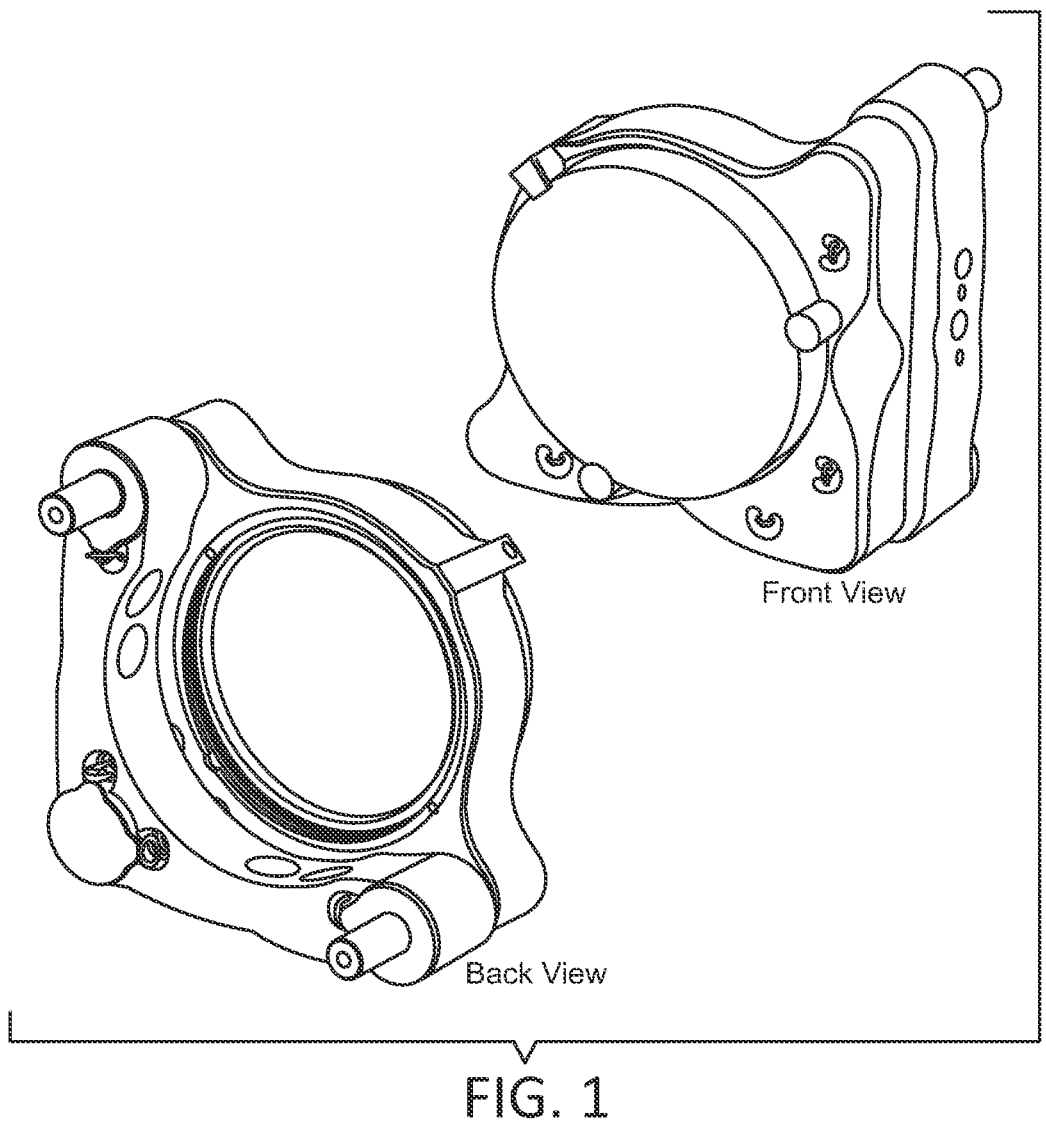
FIG. 1 shows a typical ultra-stable POLARIS Longitudinal drive kinematic mount produced by THORLABS.
Figure 2:
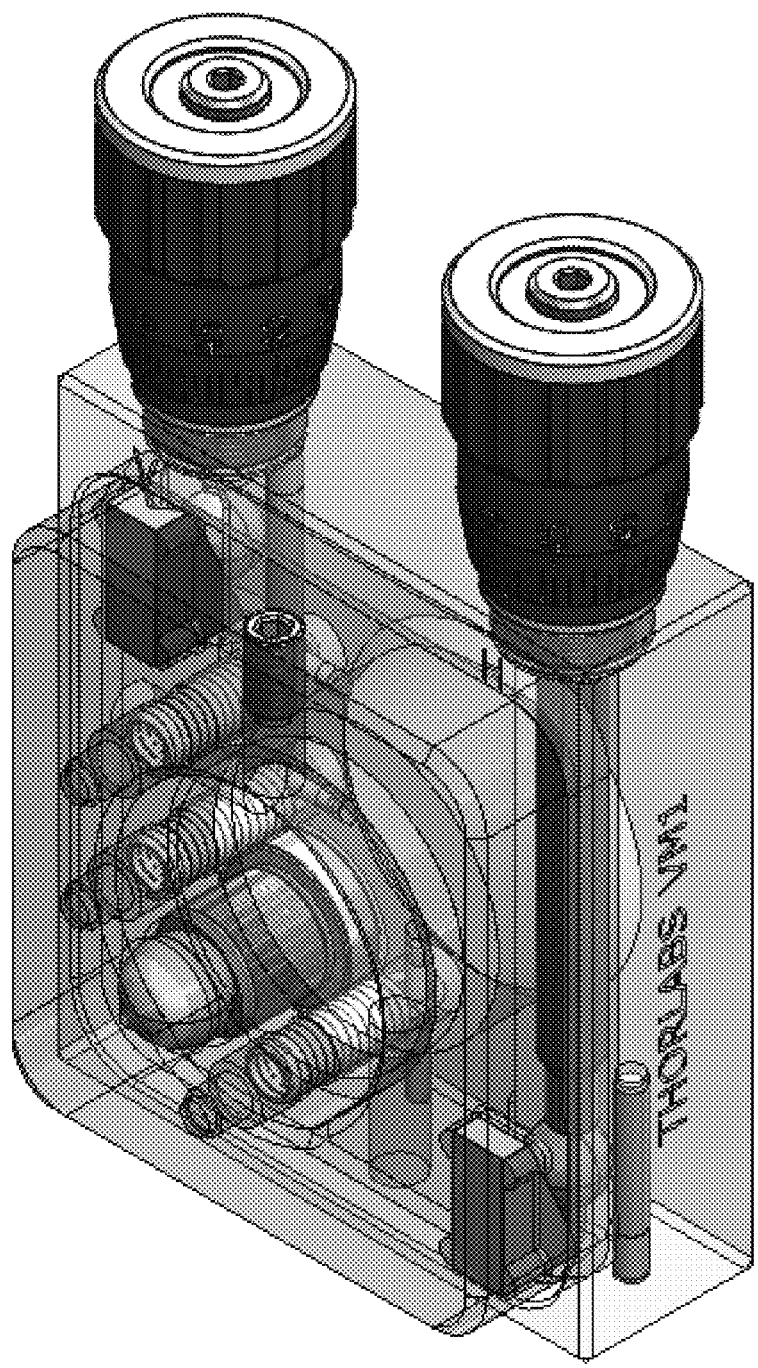
FIG. 2 shows a vertical drive mount on the market.
Figure 3:
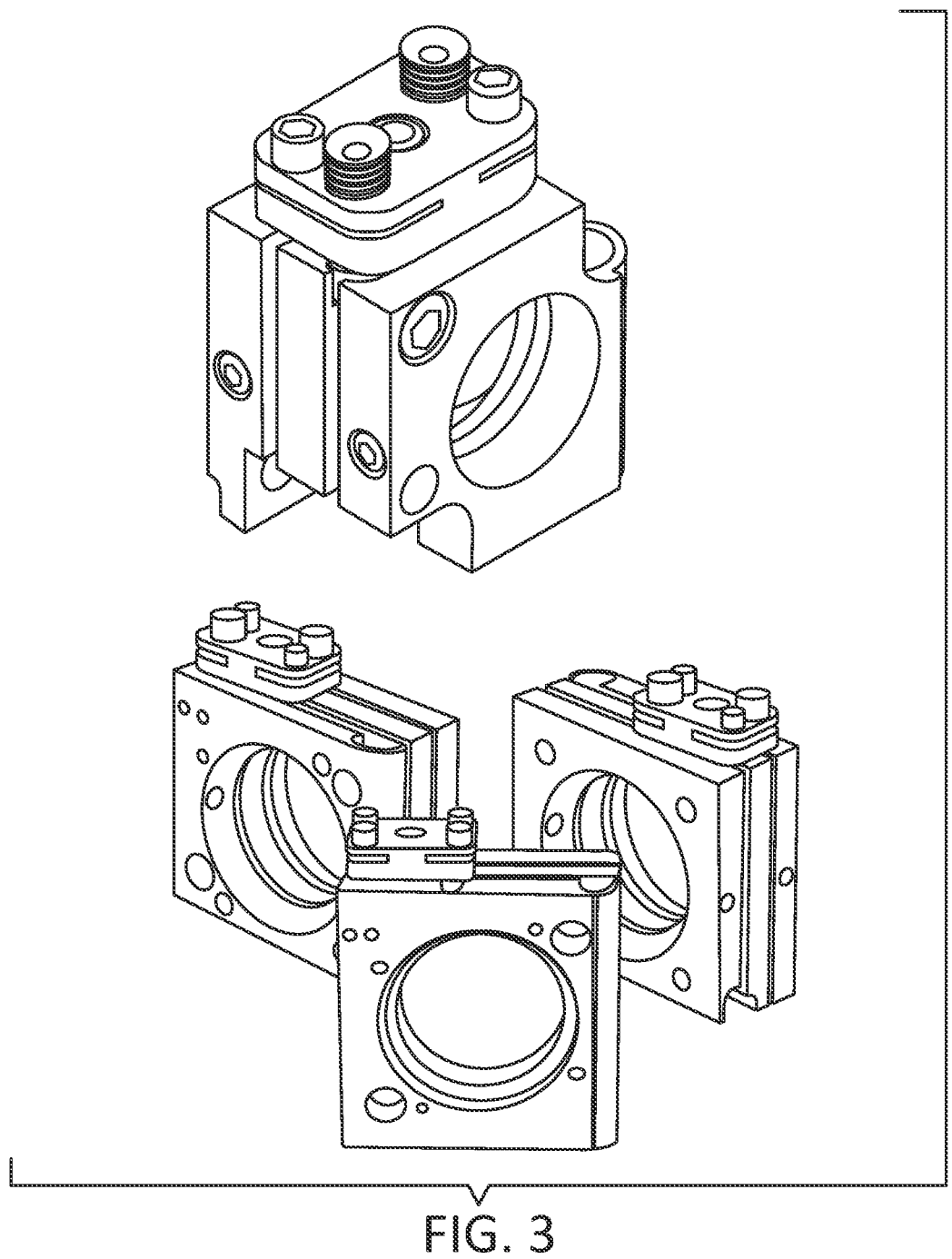
FIG. 3 shows some flexure type vertical drives on the market.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 4:
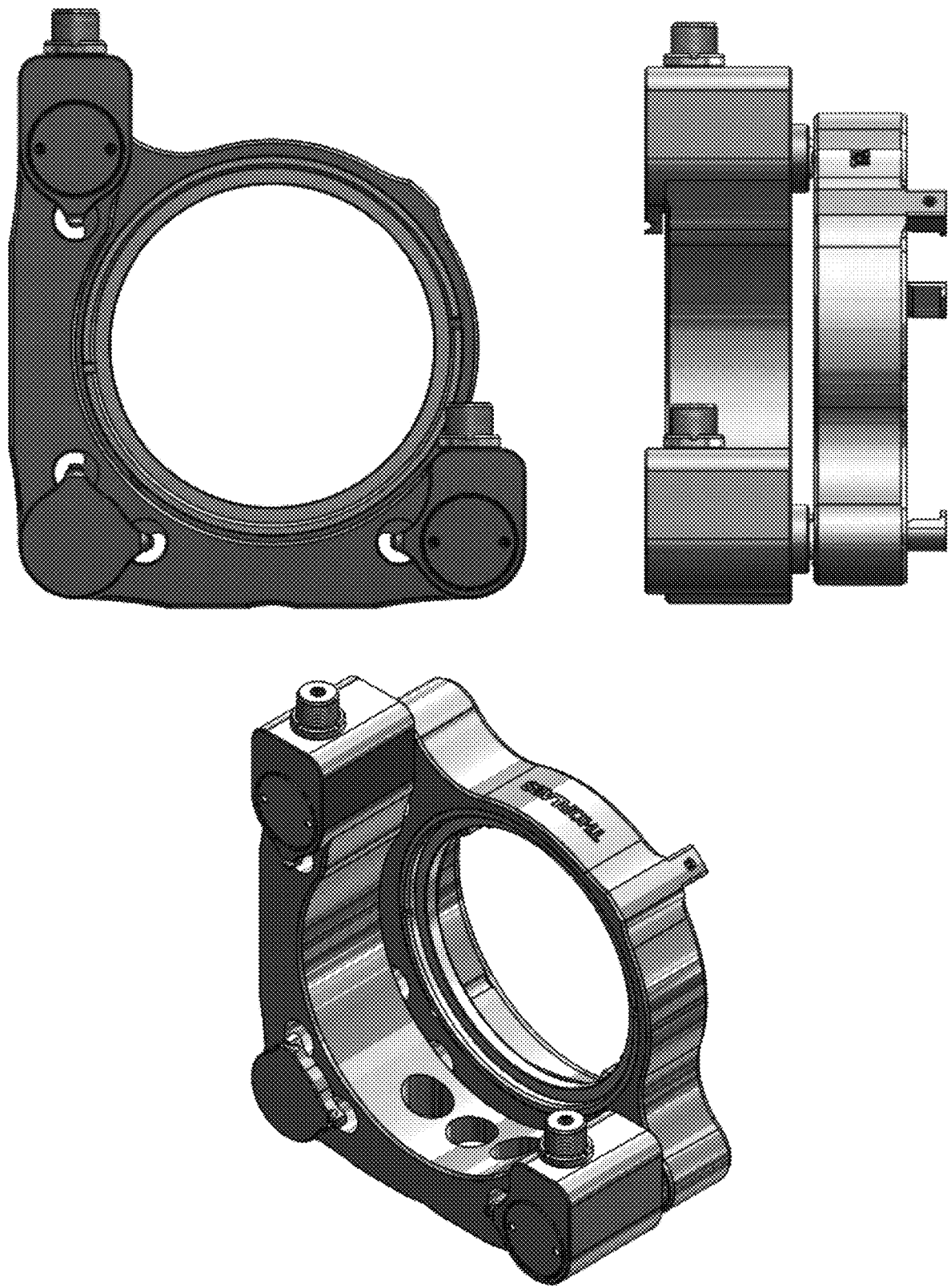
FIG. 4 shows a transverse drive kinematic optic mount according to an embodiment.
Figure 5:
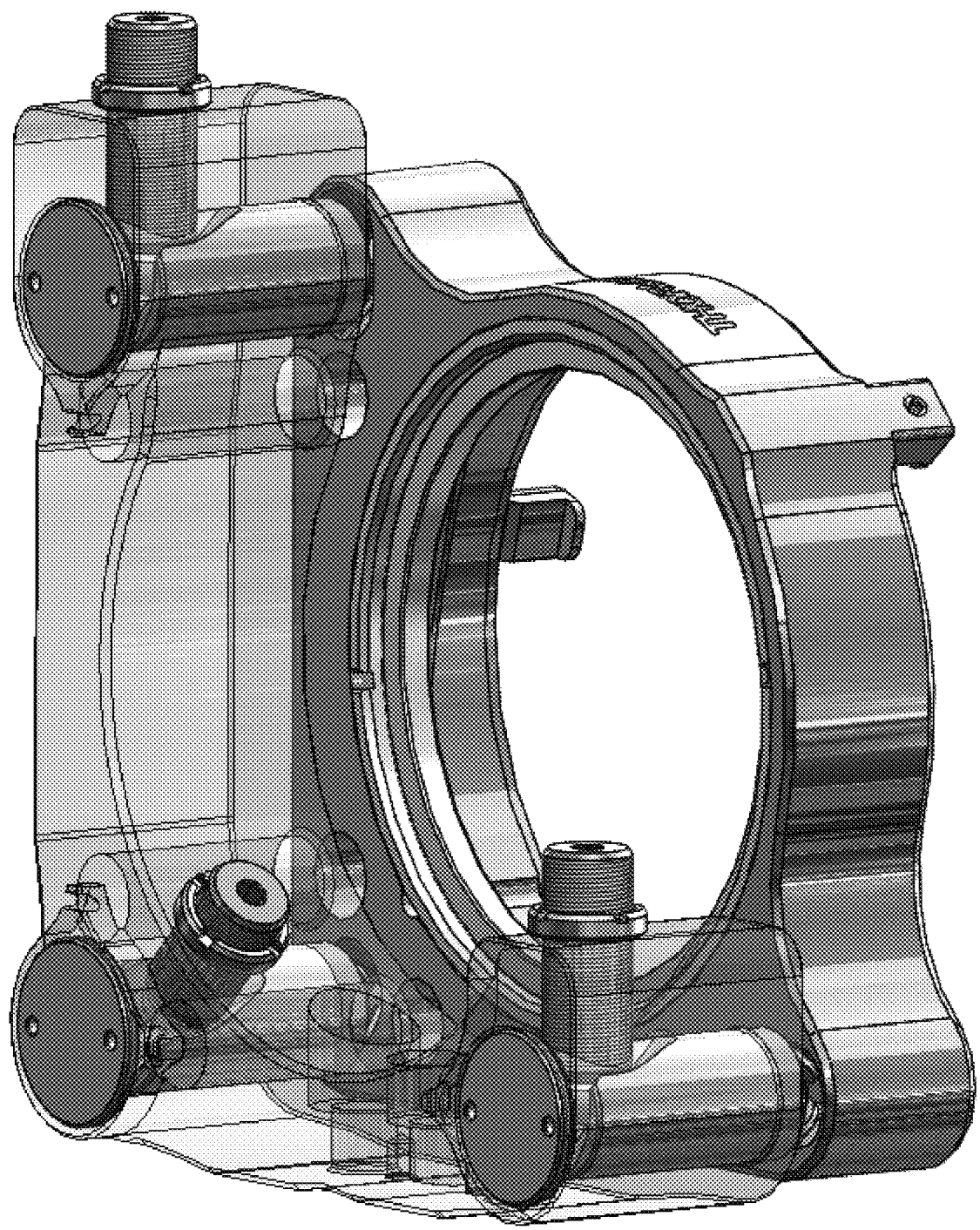
FIG. 5 shows the orientations of the drive screws in a transverse drive kinematic optic mount according to an embodiment.
Figure 6:
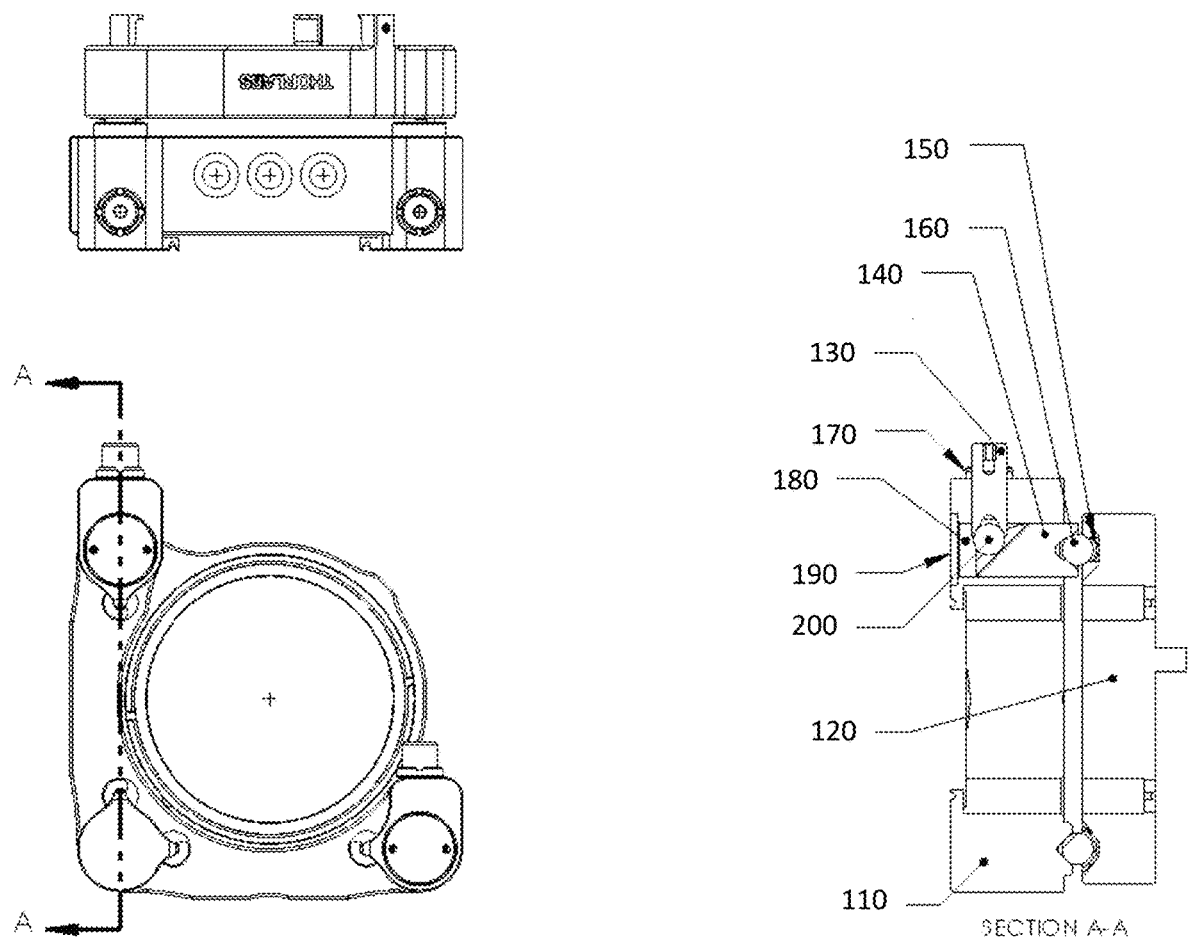
FIG. 6 shows the components in a transverse drive kinematic optic mount according to an embodiment.

A transverse drive kinematic optic mount according to an embodiment converts the rotational radial motion of an adjuster drive screw oriented transversely to the desired linear motion into an axial lineal motion that is not longitudinal to the adjuster screw, but at an angle. The angle is typically 90 degrees, but could be any angle, for example, from 5 to 175 degrees. Also, the transverse drive can be orientated at any angle about 360 degrees of the axis of the linear motion of the pusher piston. In FIG. 4, the product images according to an embodiment show the drive screw oriented at a 90 degree angle between the adjuster screw and the pusher piston motion with the adjuster screw oriented in the upward facing direction. In FIG. 5, according to one embodiment, there are two vertical adjuster drive screws, and one adjuster drive screw inclined at an angle (e.g., 45 degrees) from the vertical. FIG. 6 shows the components of a transverse drive kinematic optic mount according to an embodiment. As can be seen from FIG. 6, the transverse drive kinematic optic mount includes a first frame 110 and a second frame 120. The first frame 110 includes a drive adjuster 130 that moves along a first direction (e.g., vertical) and the drive adjuster is in contact with a ramp on a pusher piston 140. The movement of the drive adjuster 130 causes the pusher piston 140 to move in a second direction (e.g., horizontal). The pusher piston 140 pushes kinematic contacts 150 on the second frame 120 so that a controlled movement of the second frame 120 is achieved. In one example embodiment, the device includes: polished hard contact frame at 6 places 150, hardened and polished bearing ball 160, transverse pusher piston made from hard precision machined and polished material 140, fine pitch adjuster screw made from special precision machined high load material 130, adjuster lock nut 170, precision machined highly polished piston bore 180, vented piston bore seal cap 190, polished hard bearing ball 200, lens cell frame 120 and back plate frame 110.

Figure 7:
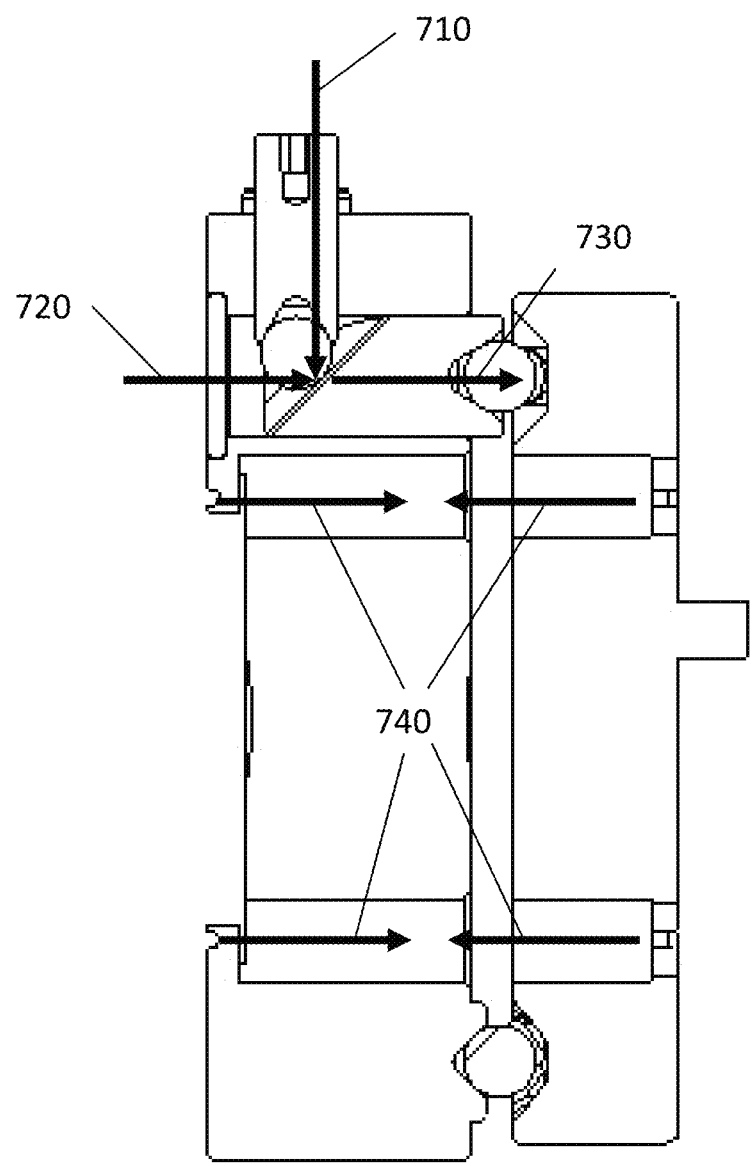
FIG. 7 shows the force vectors in a transverse drive kinematic optic mount according to an embodiment.
Figure 8:
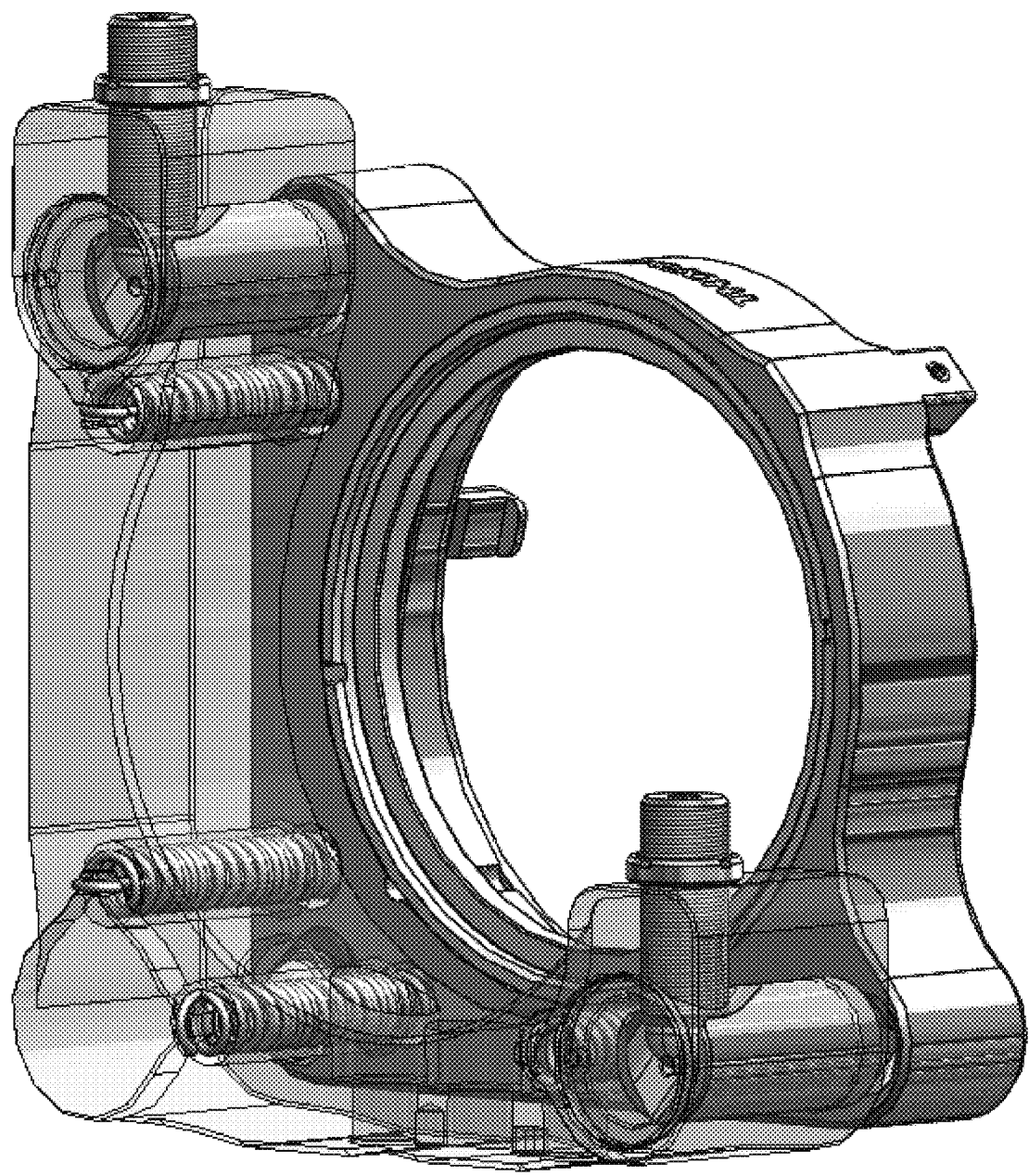
FIG. 8 shows the springs in a transverse drive kinematic optic mount according to an embodiment.
Figure 9:
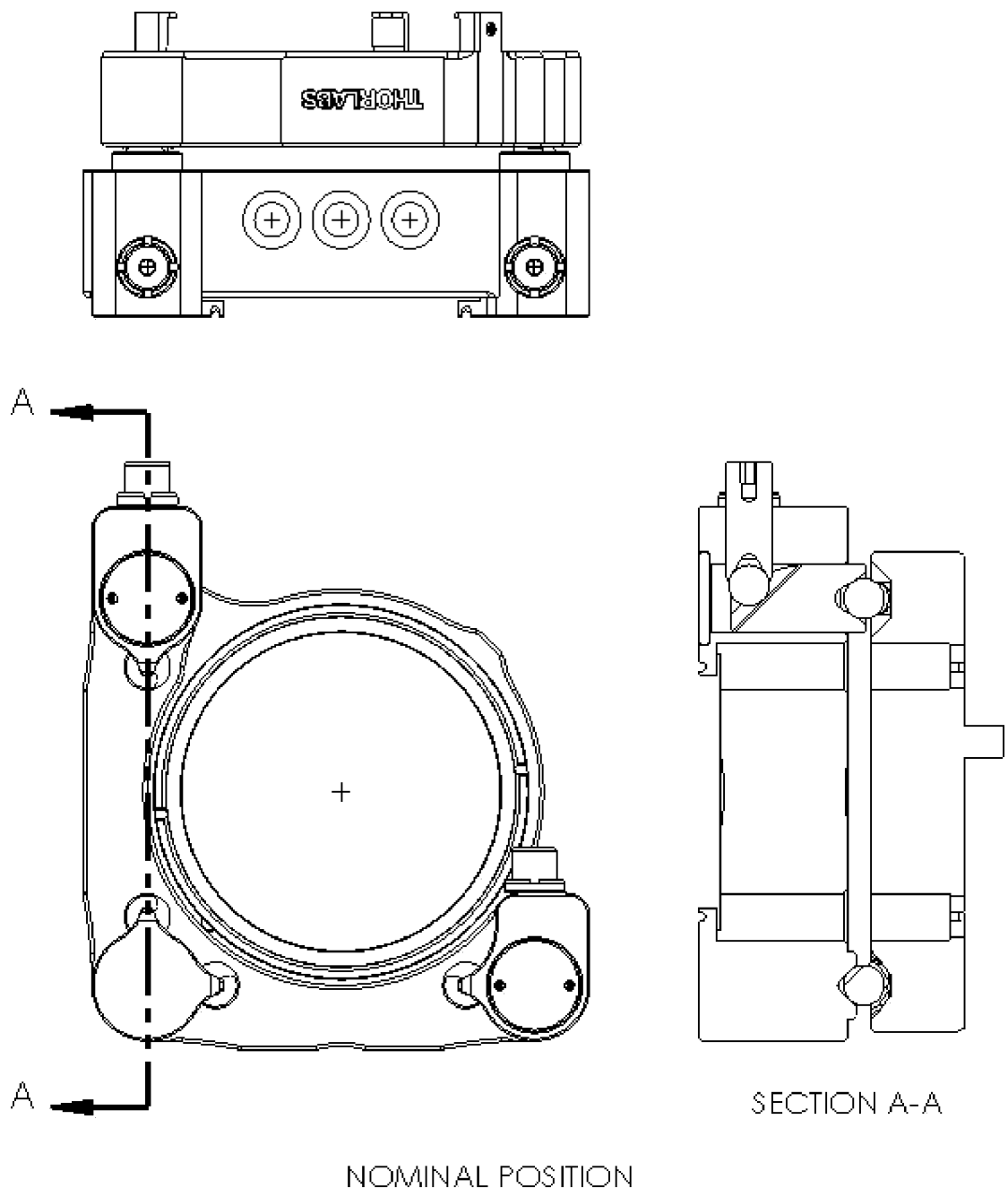
FIG. 9 shows the normal position of a transverse drive kinematic optic mount according to an embodiment.
Figure 10:
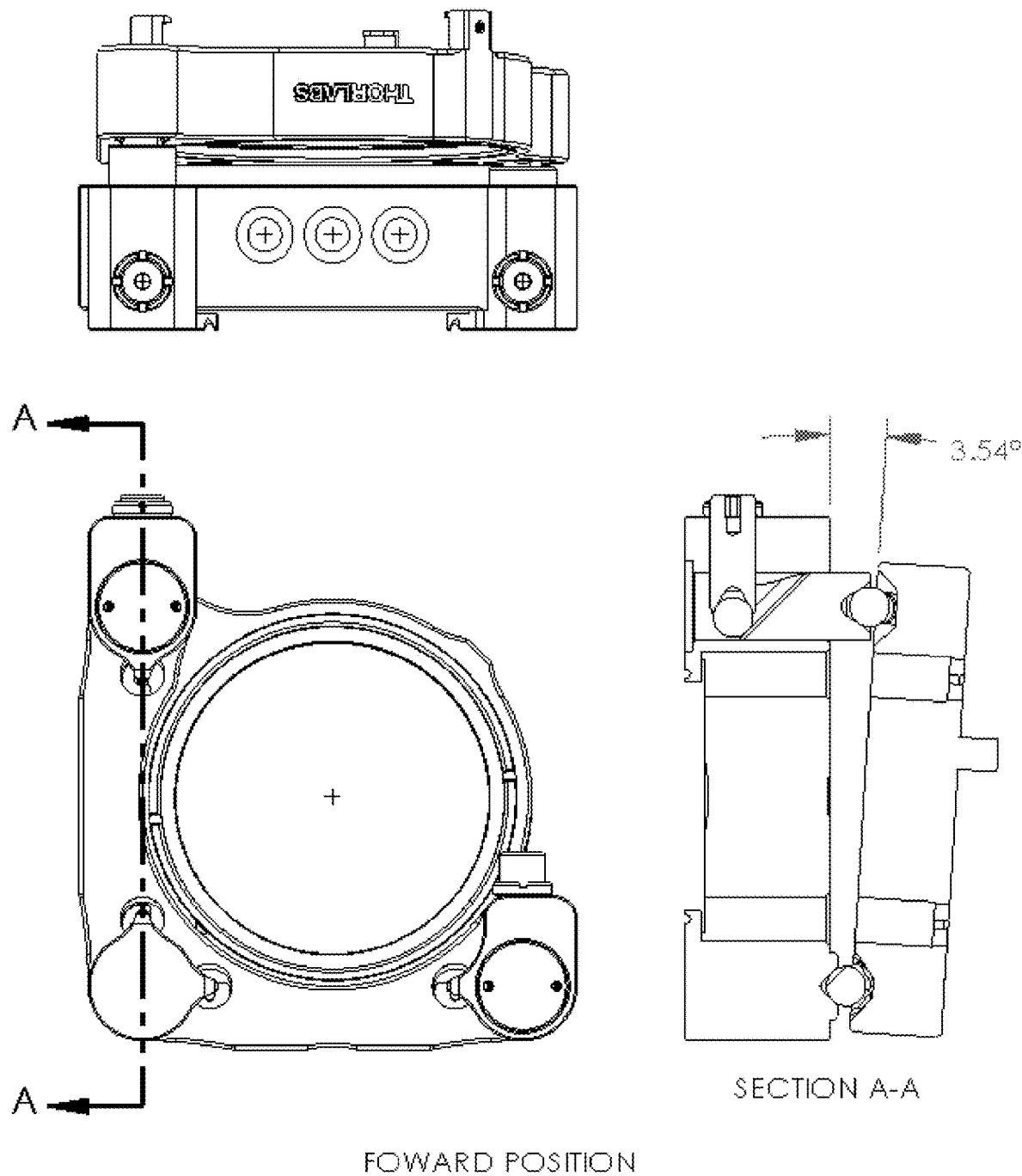
FIG. 10 shows a forward position of a transverse drive kinematic optic mount according to an embodiment.
Figure 11:
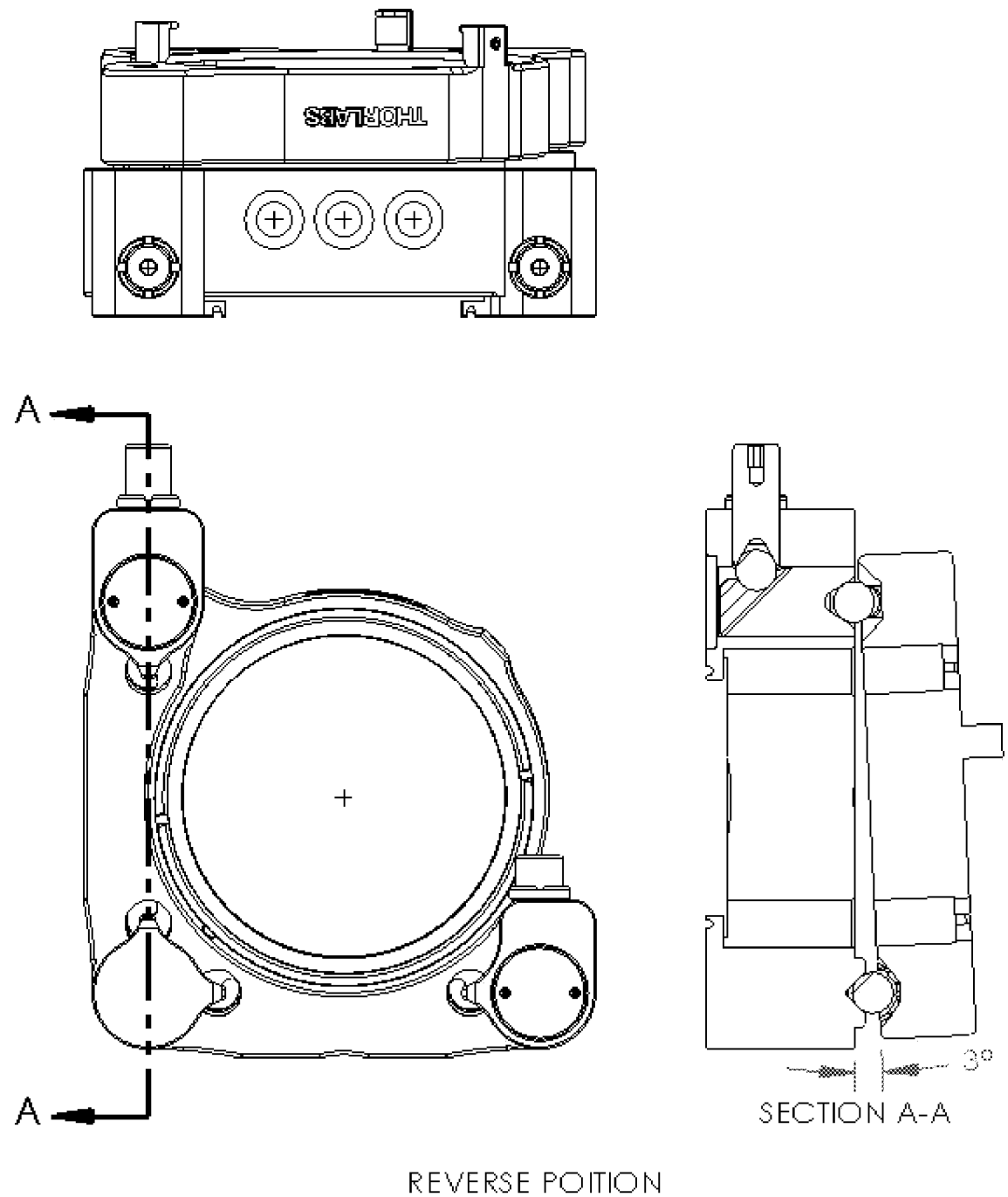
FIG. 11 shows a reverse position of a transverse drive kinematic optic mount according to an embodiment.

In one embodiment, the drive adjuster is a screw that converts radial rotation to linear motion. Other embodiments of the drive adjuster include piezoelectric actuator, electromechanical actuator, etc. The pusher piston converts the linear motion of the drive adjuster to a transverse linear motion in the unrestricted direction of the pusher piston and its bore by way of the adjuster ball and ramp contact. FIG. 7 shows the adjuster screw force y-vector 710, the adjuster screw force x-vector 720, and the pusher force vector 730. FIG. 7 also shows the spring force vectors 740. In one embodiment, as shown in FIG. 8, springs are used to provide a counter force to hold the kinematic contacts on the lens cell frame tightly against the ball contact on the pusher piston and the ramp to adjuster ball contact. The pusher piston pushes on the kinematic contacts resulting in movement of the optic cell frame. FIGS. 9-11 show the different positions of the optic cell frame depending on the position of the drive screw. The pusher piston only allows for a controlled in and out linear motion. Because pusher piston movement direction is controlled, the kinematic contacts on the optic cell frame that can be oriented in any configuration to support the desired kinematic movement. The entire system is also kinematically restrained to provide for very stable positioning of the optic cell frame.

Figure 12:
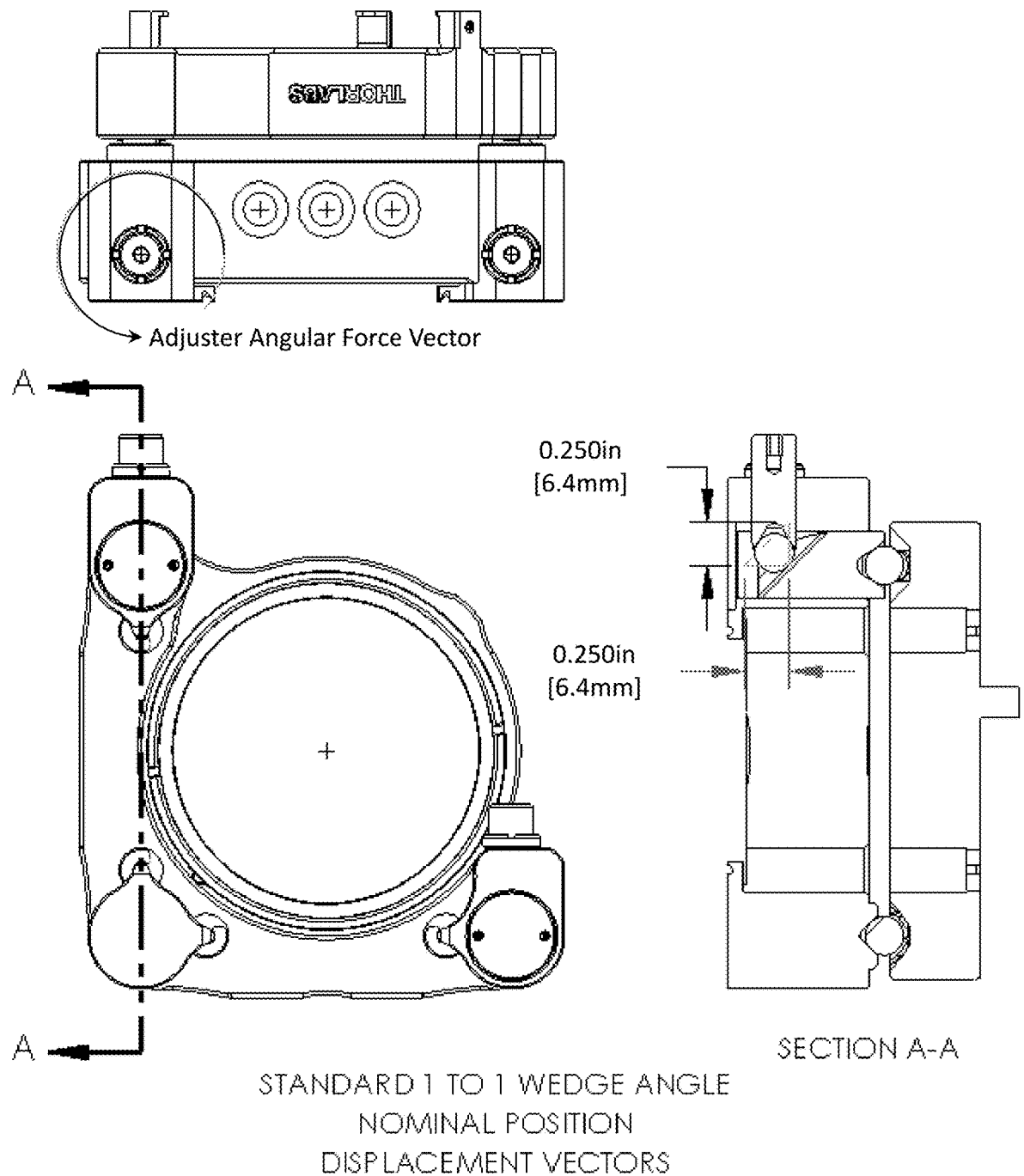
FIG. 12 shows a 1-to-1 wedge angle of a pusher piston according to an embodiment.
Figure 13:
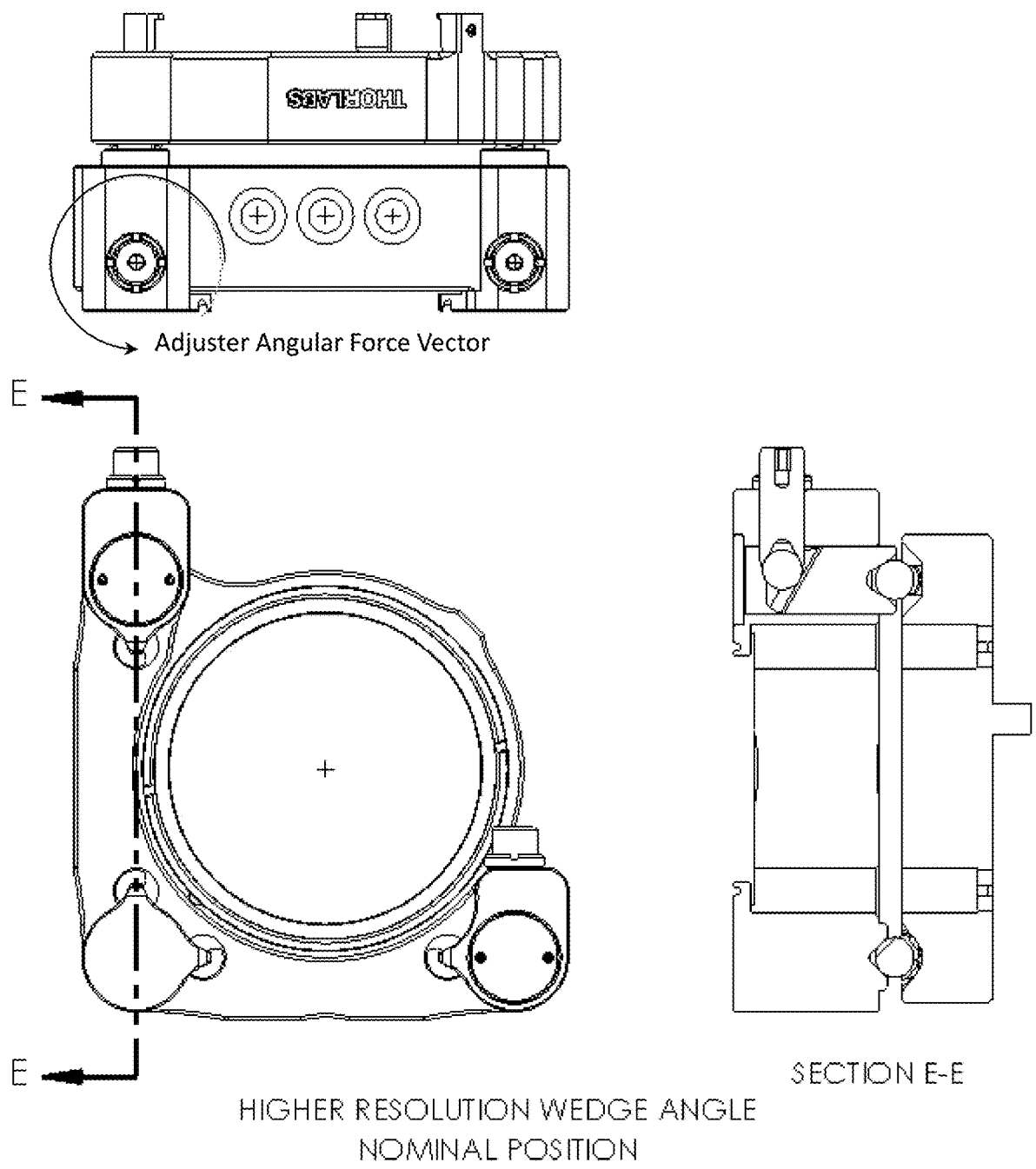
FIG. 13 shows a high resolution wedge angle of a pusher piston according to an embodiment.

Note that the resolution of kinematic movement depends on the wedge angle of the pusher piston. FIG. 12 shows a 1-to-1 wedge angle according to an embodiment, and FIG. 13 shows a higher resolution wedge angle according to another embodiment.

Figure 14:
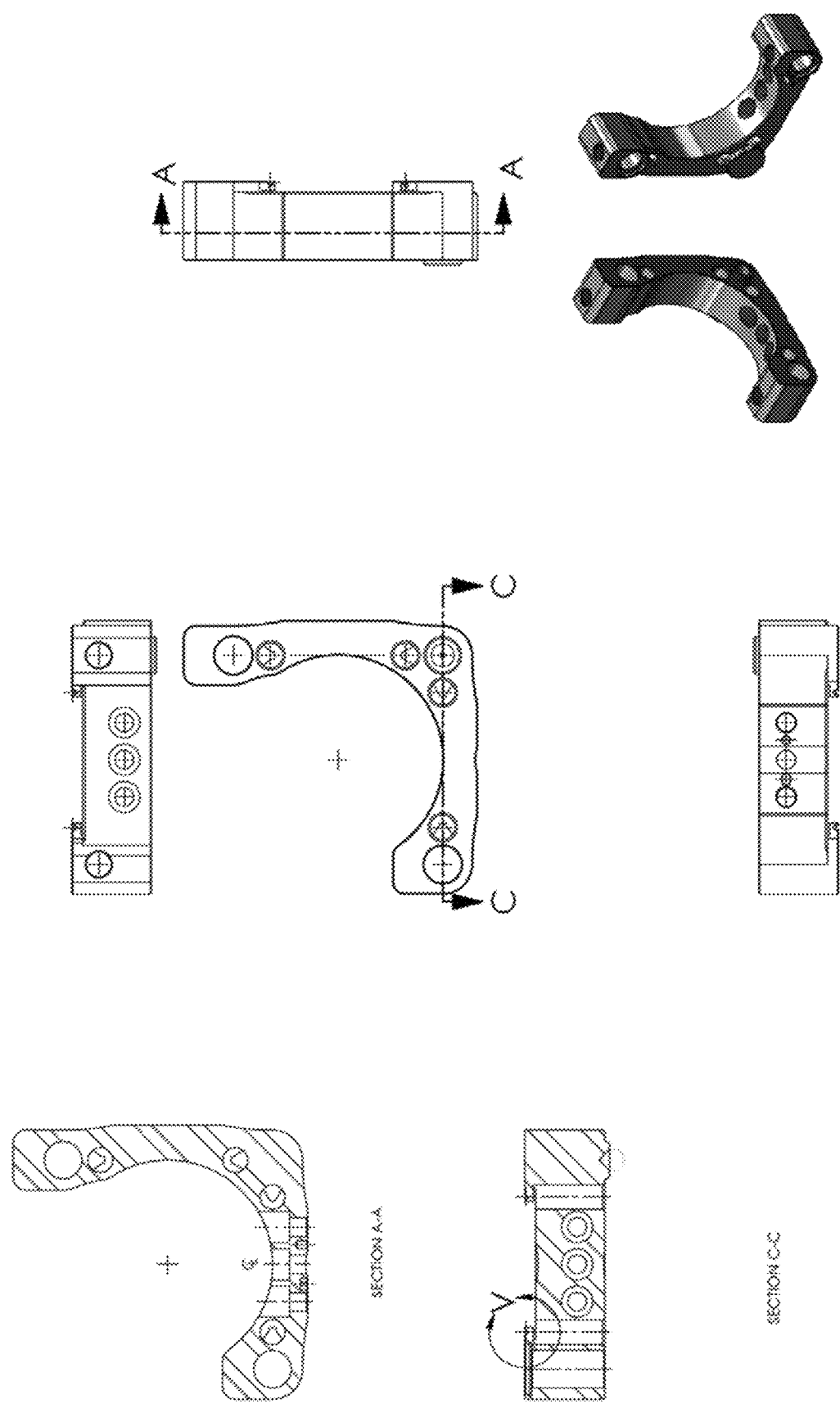
FIG. 14 shows the back plate frame of a transverse drive kinematic optic mount according to an embodiment.
Figure 15:
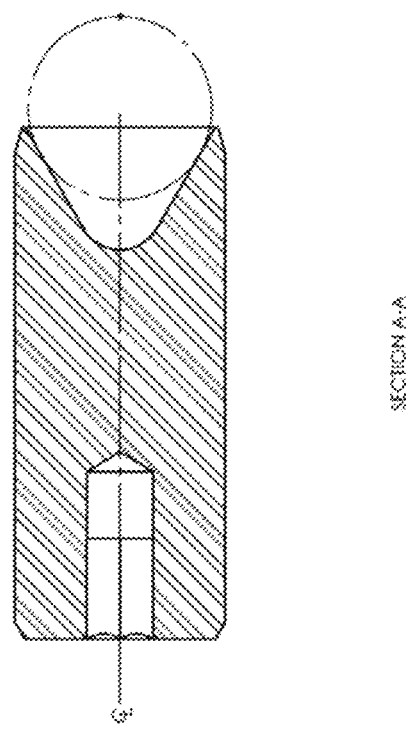
FIG. 15 shows an adjuster drive screw according to an embodiment.
Figure 15:
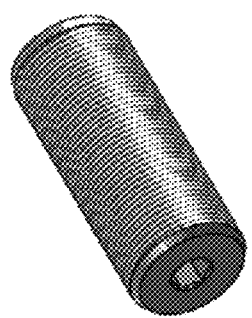
Figure 15:
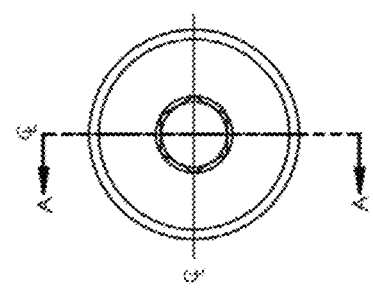
Figure 16:
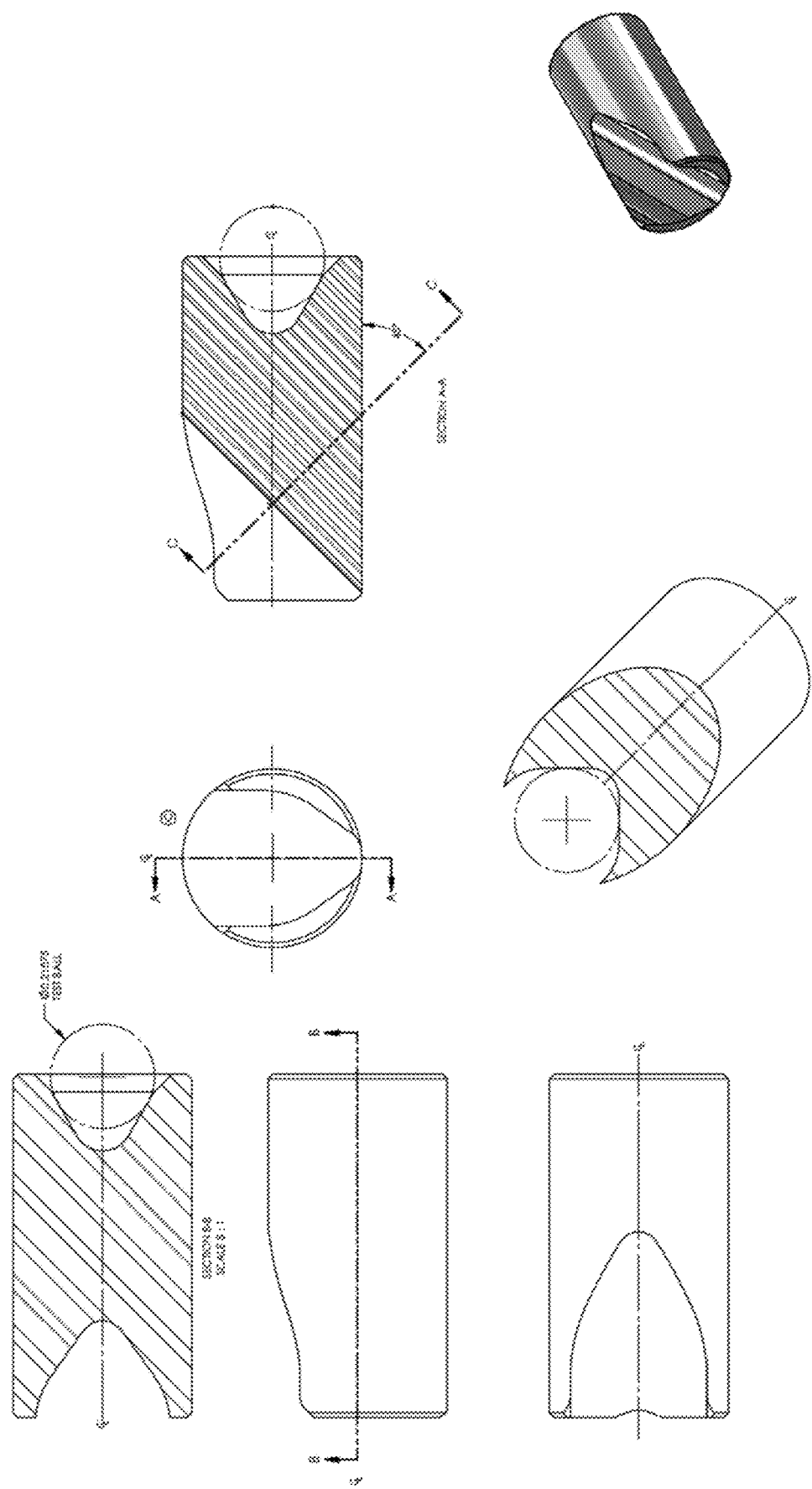
FIG. 16 shows a pusher piston according to an embodiment.
Figure 17:
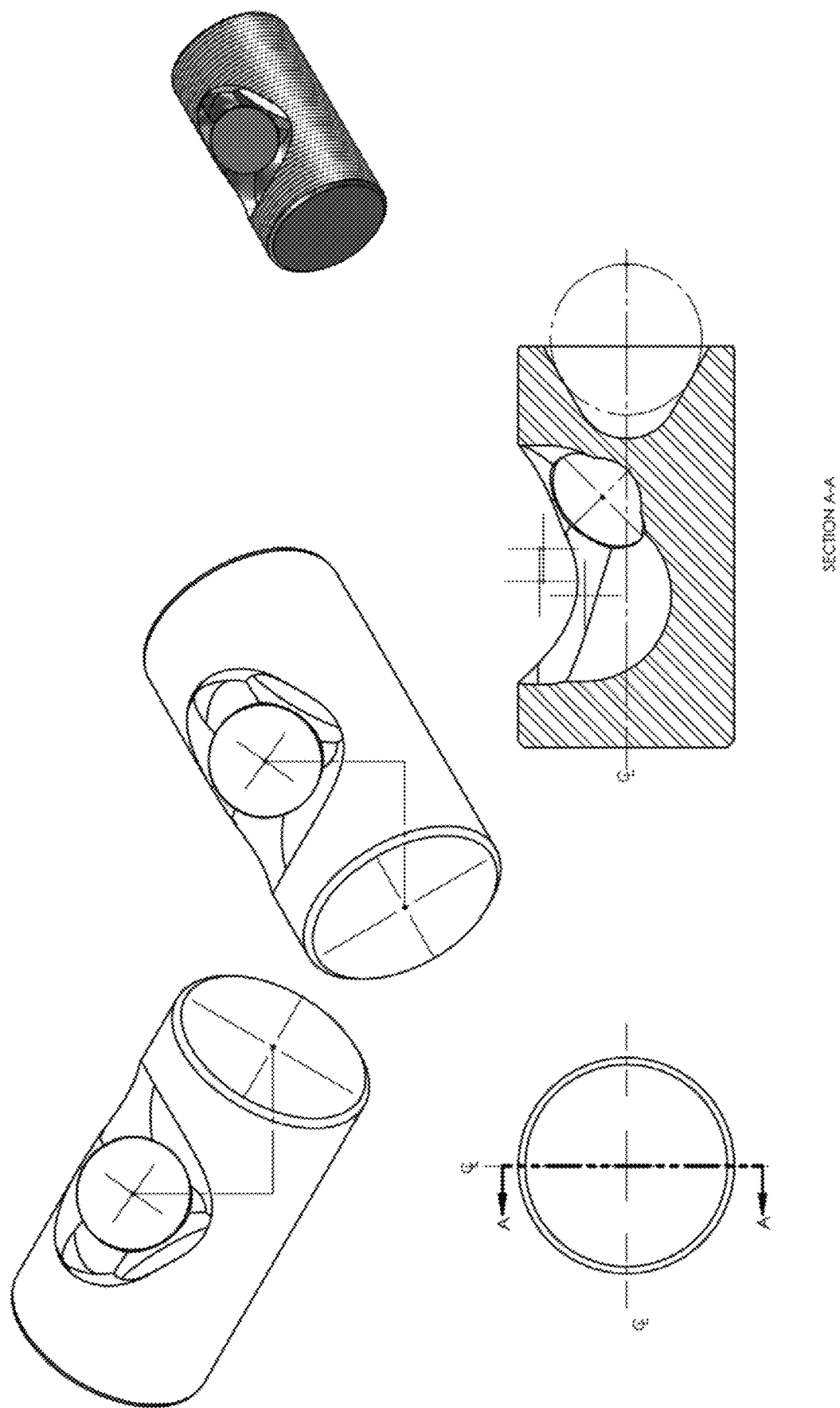
FIG. 17 shows a pusher piston according to an embodiment.

FIG. 14 is an example embodiment of a back plate frame, FIG. 15 is an example embodiment of the adjuster drive screw, and FIGS. 16 and 17 are two example embodiments of the pusher pistons in the transverse optic mount. It is understood that other designs of the frame, adjuster drive screw and pusher piston are contemplated for different application requirements.

Figure 18:
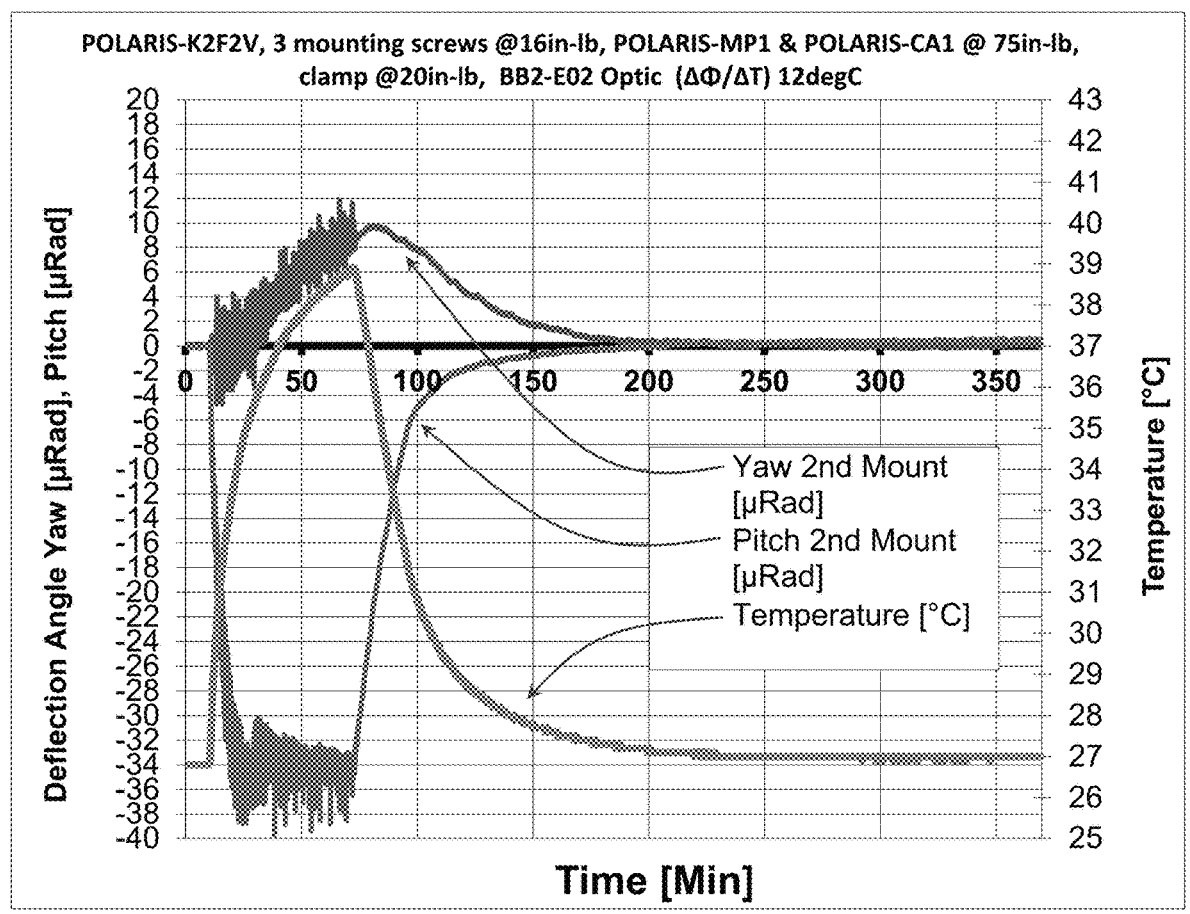
FIG. 18 shows a plot of deflection angle and temperature of mount versus time.
Figure 19:
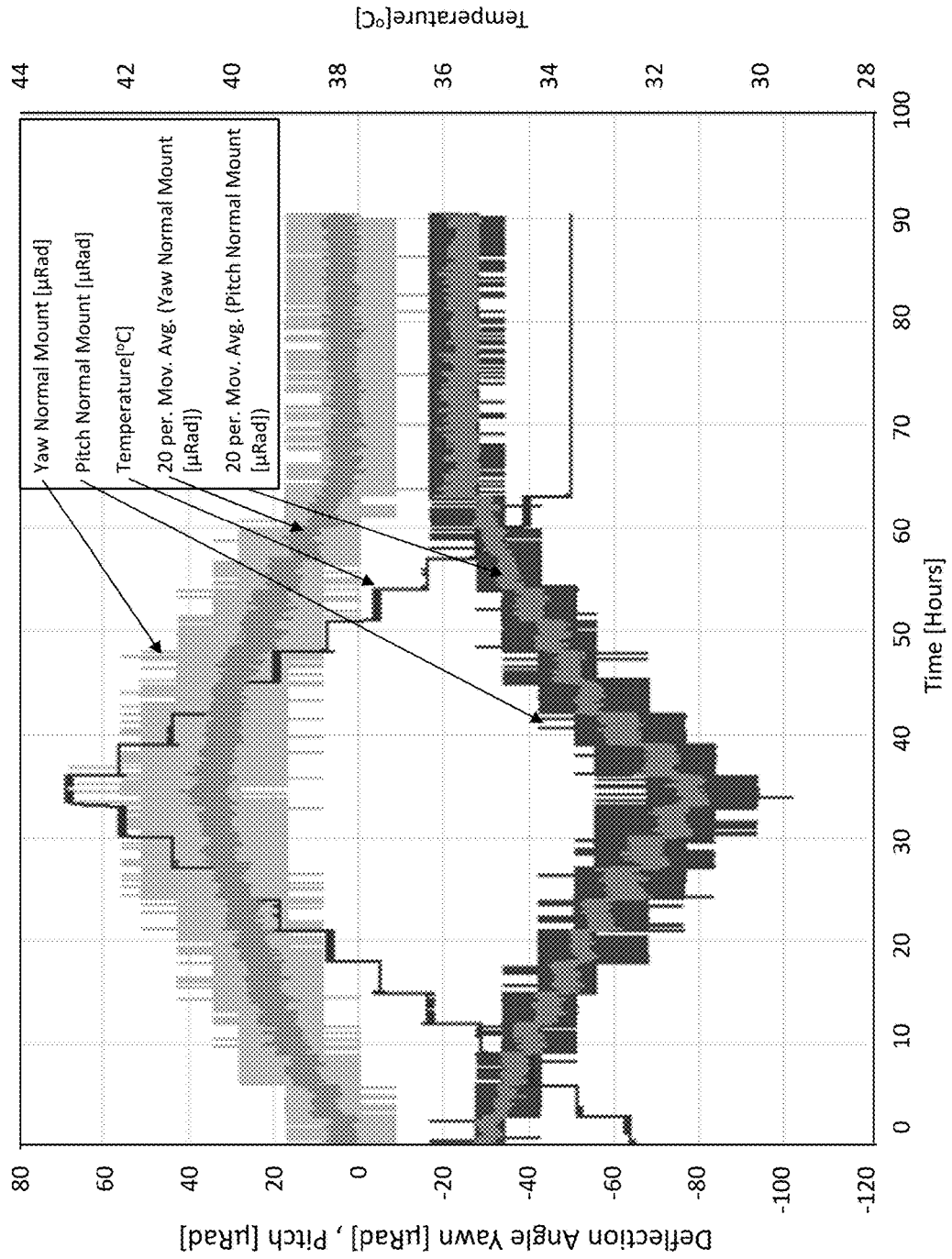
FIG. 19(A) shows plots of deflection angle and temperature of mount versus time for a normal mount.
FIG. 19(B) shows plots of deflection angle and temperature of mount versus time for a special mount.
FIG. 19(C) shows plots of yaw, pitch and temperature of mount versus time for a normal mount.
FIG. 19(D) shows plots of yaw, pitch and temperature of mount versus time for a vertical mount.
Figure 19:
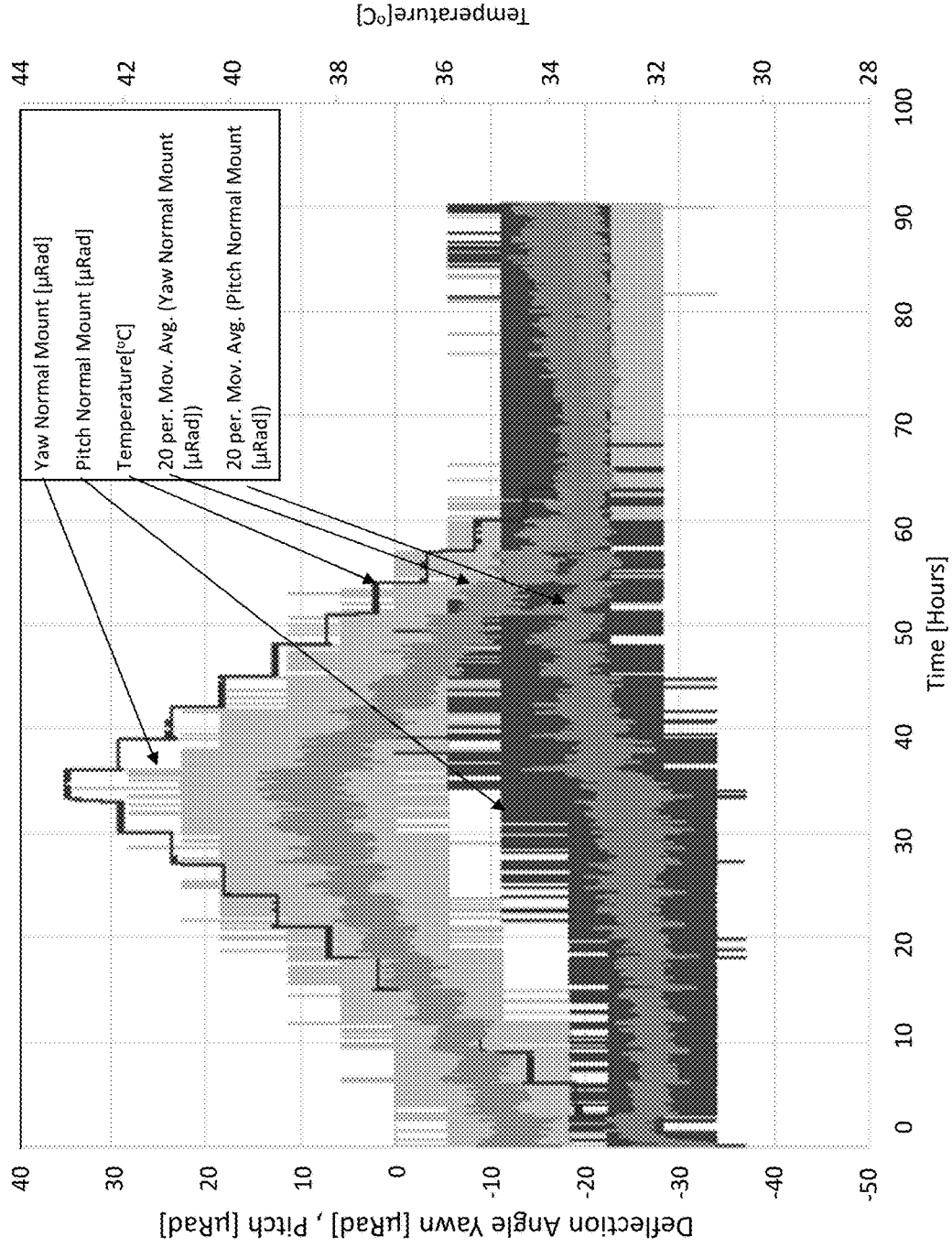
Figure 19:
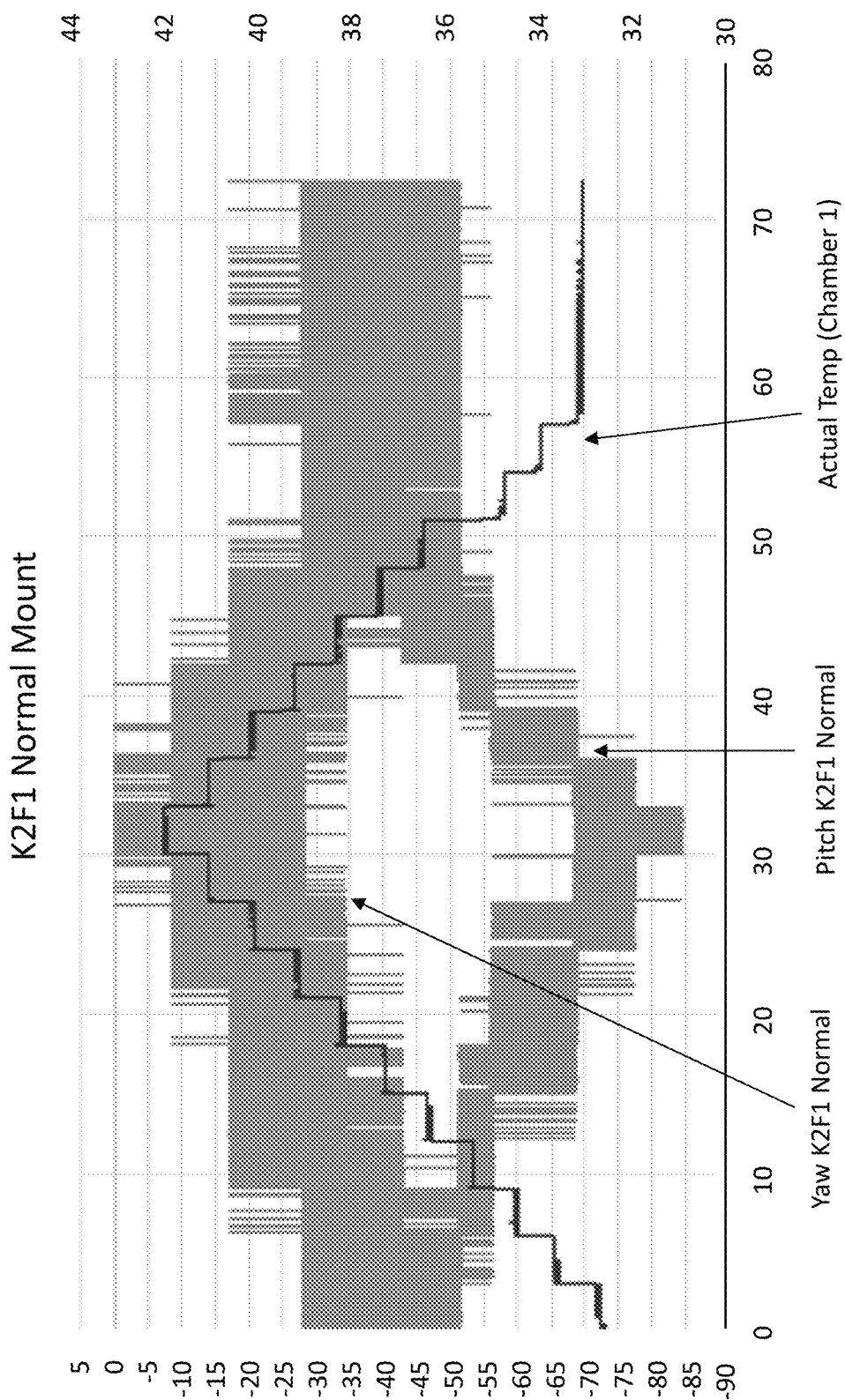
Figure 19:
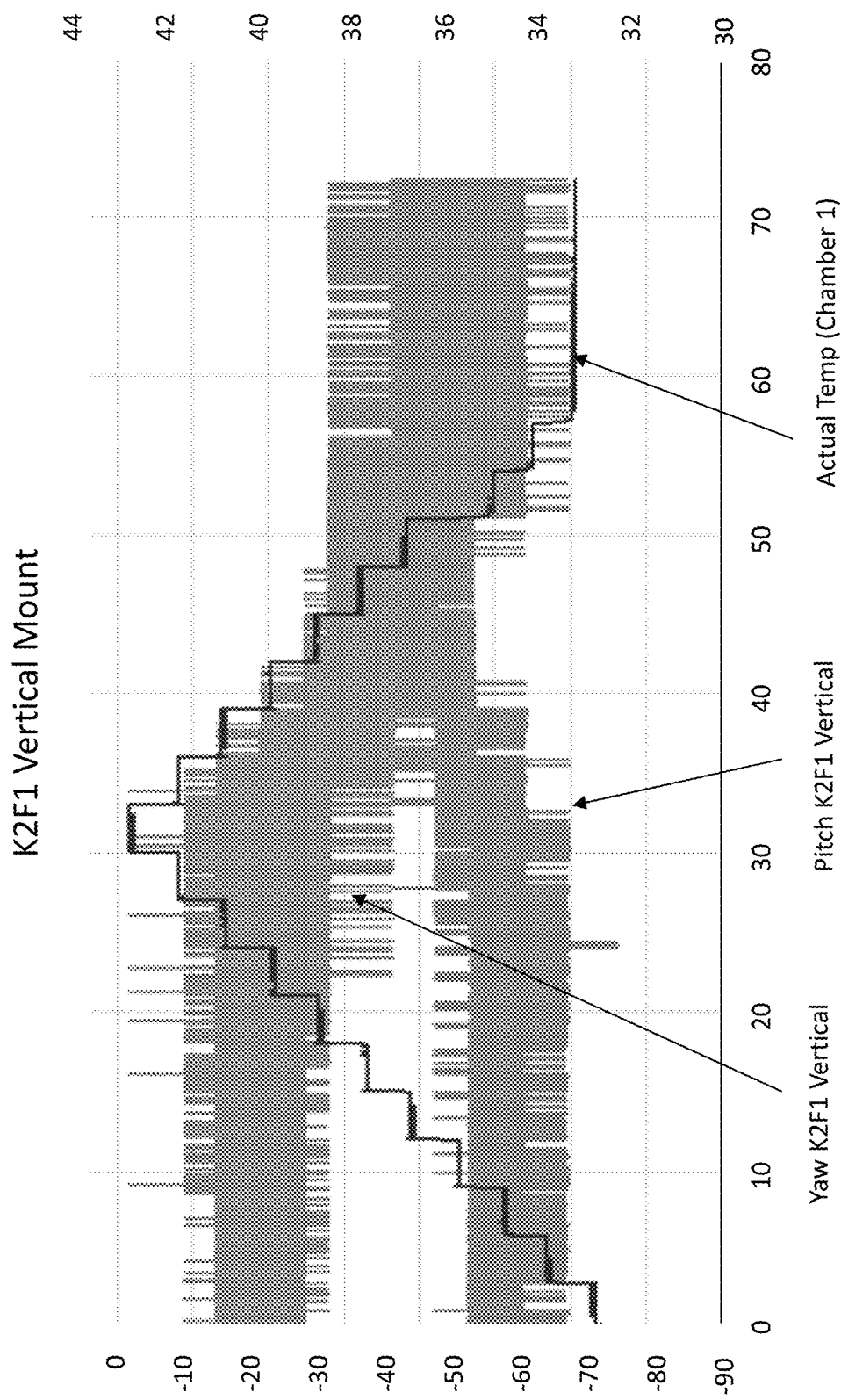
Figure 20:
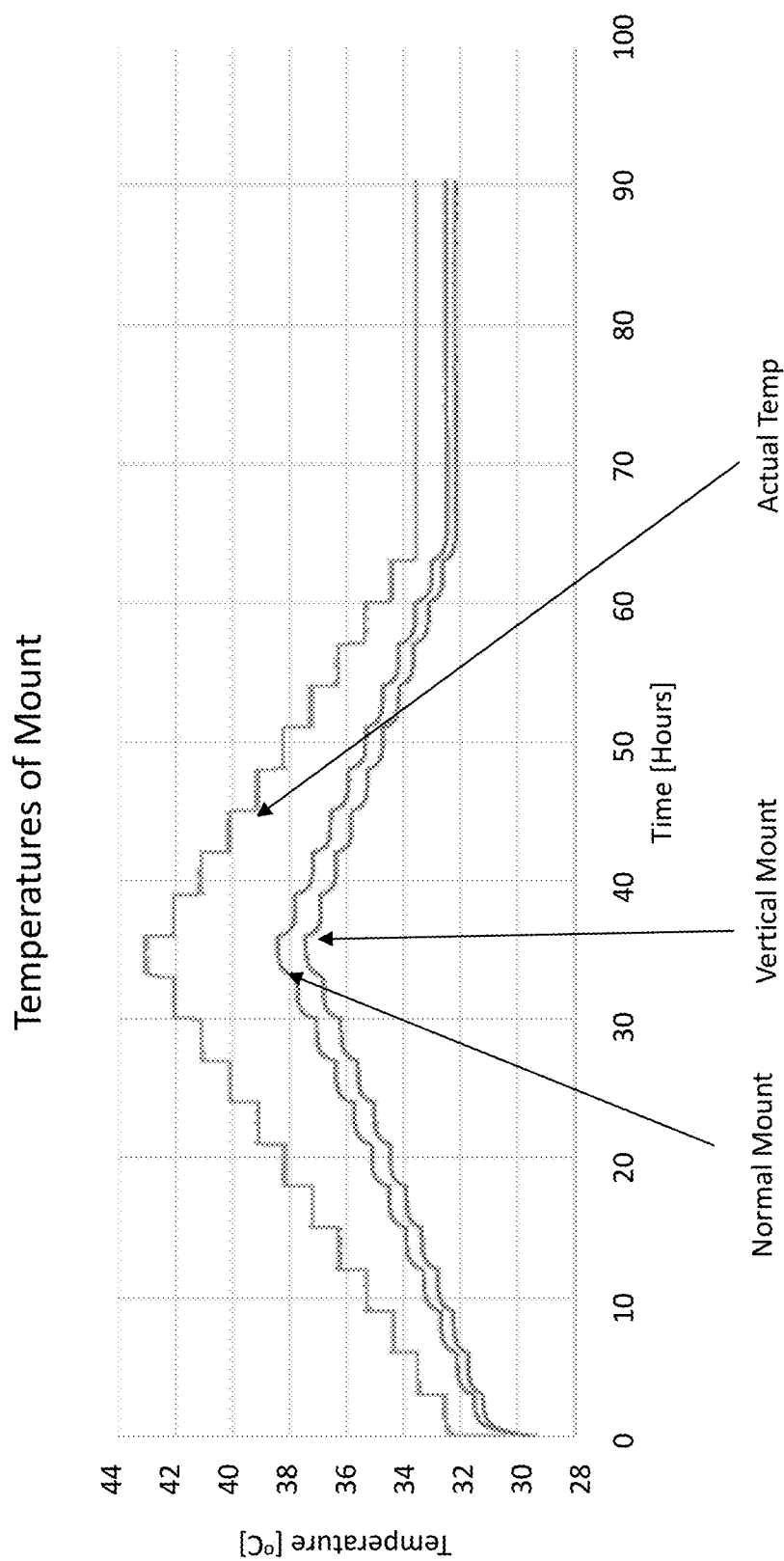
FIG. 20 shows a plot of temperature of mount versus time.

Tests have been performed on many vertical drive mounts in the industry and it is found that they have very poor beam pointing stability over temperature and vibration and also very poor adjustment resolution and large amounts of crosstalk between axial movements. In contrast, a transverse drive kinematic optic mount according to one or more embodiments of the present invention has very good beam pointing stability over temperature and vibration, also fine adjustment resolution and no measurable crosstalk between axial movements. FIGS. 18-20 shows the performance plots of the POLARIS-K2F1 product verse a transverse drive kinematic optic mount according to an embodiment. As can be seen in the beam pointing stability data over temperature the ultra-stable POLARIS-K2F1 produced by THORLABS commonly known as the most stable mirror mounts in the industry and the transverse drive kinematic optic mount according to an embodiment perform very similar over temperature.

The kinematic contacts on the spectrum of many drive mount products currently available in the industry have a poor surface toughness and wear out very quickly. In contrast, a transverse drive kinematic optic mount according to one or more embodiments of the present invention uses all hardened kinematic contacts. Typically hardened, tempered and polished 440C bearing steel and polished sapphire contacts that are virtually resistant to ware and have very low contact friction.

The drive mechanisms on the drive mount products currently available in the industry have not taken into account the effects of thermal expansion, and they typically have a short and long pusher that expand and contract at different rates. In contrast, a transverse drive kinematic optic mount according to one or more embodiments of the present invention controls thermo expansion with minimal beam steering over temperature, has balanced movements in the pitch and yaw axis providing for better stability over temperature and vibration, and has kinematic slip planes that are oriented such that they control the center of thermal kinematic inertia to minimize optic movement and beam steering over temperature. FIG. 18 shows the performance plots of a transverse drive kinematic optic mount according to one embodiment.

Most of the drive mount products currently available in the industry have a lot of slop throughout the kinematic structure in particular the push rod linkage. In contrast, a transverse drive kinematic optic mount according to one or more embodiments of the present invention has a tightly controlled kinematic structure. The drive screw is tightly matched to its mating thread, the pusher piston the tightly matched to its mating bore and has full kinematic restraint and the kinematic contacts are oriented to support full kinematic restraint. All slop in the mechanical system is tightly controlled. Furthermore, the transverse drive kinematic optic mount separates the transverse movement mechanism from the main kinematic movement mechanism allowing each to be optimized in orientation, to achieve the desired function kinematic function, and has kinematic slip planes that are oriented such that they control linear movement of the pitch and yaw axis to minimize or eliminate crosstalk between the axes.

Drive mount products currently available in the industry have a fixed drive angle. In contrast, a transverse drive kinematic optic mount according to one or more embodiments of the present invention allows the drive angle to be changed over a 360 degree angular range and still achieve the same function. This allows us to configure the product to have an adjuster drive screw oriented at any angle about the pusher piston rotation axis. The transverse drive kinematic optic mount allows for the center adjuster to be driven by rotating the adjuster drive screw to allow tool access at an angle, allows for the center adjuster to be driven locating the center adjuster drive screw behind the top position drive screw, and allows for adjustment of all 3 adjusters.

This invention solves the problems that previously prevented a transverse drive or vertical drive mount from achieving the same type of performance only previously available from an ultra-precision kinematic mounts configured in the longitudinal drive configuration.

While the present invention has been described at some length and with some particularity with respect to the several described embodiments, it is not intended that it should be limited to any such particulars or embodiments or any particular embodiment, but it is to be construed so as to provide the broadest possible interpretation in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

The invention claimed is:

1. An optical mount comprising a first frame and a second frame;
   wherein the first frame comprises a drive adjuster configured to move along a first direction and the drive adjuster is in contact with a ramp on a pusher piston, such that a movement of the drive adjuster causes the pusher piston to move along a second direction;
   wherein the pusher piston is configured to push kinematic contacts on the second frame, resulting in a controlled movement of the second frame by the drive adjuster.

2. The optical mount of claim 1, wherein the drive adjuster is a screw that pushes on the ramp of the of the pusher piston.

3. The optical mount of claim 1, wherein the drive adjuster is a piezoelectric actuator that pushes on the ramp of the of the pusher piston.

4. The optical mount of claim 1, wherein the drive adjuster is a piezoelectric actuator mounted into an adjuster screw that pushes on the ramp of the of the pusher piston.

5. The optical mount of claim 1, wherein the drive adjuster is an electro-mechanical actuator that pushes on the ramp of the of the pusher piston.

6. The optical mount of claim 1, wherein the drive adjuster is a mechanical actuator that pushes on the ramp of the of the pusher piston.

7. The optical mount of claim 1, wherein the drive adjuster comprises a ball nested between the adjuster and the pusher piston ramp.

8. The optical mount of claim 1, wherein the drive adjuster comprises an integrated rounded contact between the adjuster and the pusher piston ramp.

9. The optical mount of claim 1, wherein the pusher piston comprises a ball nested between the pusher piston and the kinematic contacts.

10. The optical mount of claim 1, wherein the pusher piston comprises an integrated rounded contact between the pusher piston and the kinematic contacts.

11. The optical mount of claim 1, wherein the pusher piston comprises an integrated electro-mechanical actuator integrated within.

12. The optical mount of claim 1, wherein the pusher piston comprises a piezoelectric actuator integrated within.

13. The optical mount of claim 1, wherein the pusher piston comprises a negative linear coefficient of thermal expansion material integrated within to counter the linear coefficient of thermal expansion of the pusher piston, or to stabilize other movement over temperature in the assembly.

14. The optical mount of claim 1, wherein the drive adjuster that pushes on the ramp of the piston is oriented in any angle from 0 to 360 degrees about the axis of rotation of the pusher piston.

15. The optical mount of claim 1, wherein the drive adjuster that pushes on the ramp of the pusher piston that is oriented in any angle from greater than 0 to less than 180 degrees normal to the ramp on the pusher piston.

16. The optical mount of claim 1, wherein the pusher piston ramp has different angles to achieve different drive ratios.

17. The optical mount of claim 1, wherein the adjuster that pushes on the ramp of the of the pusher piston is oriented in any angle from greater than 0 to less than 180 degrees normal to the ramp on the drive piston to achieve different drive ratios.

18. The optical mount of claim 1, wherein the pusher piston has a V-shaped ramp with two kinematic contact planes that contact the drive adjuster allowing the pusher piston to rotate as the two contact forces are balanced and self-align the V-grove normal to the drive adjuster.

19. The optical mount of claim 1, wherein the pusher piston translates perpendicular to the moveable kinematic frame allowing for any configuration of the kinematic contacts of the moveable frame.

20. The optical mount of claim 1, wherein the pusher piston translates perpendicular to the moveable kinematic frame allowing the kinematic contact orientation to be optimized for the desired kinematic movement and thermal kinematic performance.

21. The optical mount of claim 1, wherein the pusher piston translates perpendicular to the moveable kinematic frame allowing the kinematic contact slip planes orientation to be facing the center of the optic to provide best optic centration over temperature when optic centration is critical to function.

22. The optical mount of claim 1, wherein the pusher piston translates perpendicular to the moveable kinematic frame allowing the kinematic contact slip planes orientation to be facing the direction of translation when the minimizing crosstalk during translation is critical to function.

23. The optical mount of claim 1, wherein the pusher piston translates perpendicular to the moveable kinematic frame allowing the kinematic contact slip planes orientation to be tuned to achieve a desired kinematic center of inertia to improve function.

24. The optical mount of claim 1, wherein the pusher piston translates perpendicular to the moveable kinematic frame allowing the kinematic contact slip planes orientation to be tuned to achieve a desired kinematic thermal center of inertia to improve function.

25. The optical mount of claim 1, wherein the pusher piston is fully restrained by a bore and can only translate back and forth along the second direction.

26. The optical mount of claim 1, wherein the center adjuster location is rotatable about the axis of rotation of the pusher piston screw to allow tool access or actuator fitment at any desired angle.

27. The optical mount of claim 1, wherein the center adjuster location is located behind the top adjuster to allow two adjuster and pusher piston pairs to drive kinematic movements located above and below each other.

28. The optical mount of claim 1, wherein multiple pairs of actuators is placed behind one another with consecutively longer pusher piston pairs below each other to allow many adjuster and pusher piston pair drives to be stacked over one another, allowing a stack of kinematic frames to be controlled with a transverse adjustment and movement.

29. The optical mount of claim 1, wherein multiple pairs of actuators are placed behind one another with consecutively longer pusher piston pairs below each other but also rotated counter to each other to allow many adjuster and pusher piston pair drives to be stacked over one another and nested within one another similar to the piston pattern in a V-style engine, allowing a stack of kinematic frames to be controlled with a transverse adjustment and movement but with shorter pusher piston lengths.

30. The optical mount of claim 1, further comprises a vented cap behind the pusher piston to prevent contamination, encapsulate the lubrication and act as a piston stop.

31. The optical mount of claim 1, further comprises a vented frame and a non-vented cap behind the pusher piston to prevent contamination, encapsulate the lubrication and act as a piston stop.

32. The optical mount of claim 1, wherein the adjuster screw is locked into place using an adjuster lock nut.

* * * * *